3,444,266
CROSS-LINKED POLYURETHANES FROM VINYL POLYMERS AND POLYESTER URETHANES CONTAINING AT LEAST 3% HEXANE-1,6-DIOL AND 2,2-DIMETHYL PROPANE-1,3-DIOL
Artur Reischl, Leverkusen, Wilhelm Göbel, Cologne-Flittard, and Karl-Ludwig Schmidt, Opladen, Germany, assignors to Farbenfabriken Bayer Aktiengesellschaft, Leverkusen, Germany, a corporation of Germany
No Drawing. Filed Mar. 11, 1964, Ser. No. 351,191
Claims priority, application Germany, Mar. 13, 1963, F 39,239
Int. Cl. C08f 29/20, 29/50
U.S. Cl. 260—859                                    4 Claims

ABSTRACT OF THE DISCLOSURE

Light stable homogeneous plastic compositions are prepared from polyvinyl chloride, polyvinylidene chloride, polyvinyl acetate and copolymers thereof mixed with a polyurethane comprised of an organic polyisocyanate and a polyester having a molecular weight of from about 400 to about 4000, about 5 to about 100% by weight of the polyester being a mixed polyester of a dicarboxylic acid and at least two polyhydric alcohols, each of the alcohols being present in the mixed polyester in an amount of at least 3 mol percent, the urethane comprising at least about 25% by weight of the admixture.

---

This invention relates to a process for the production of synthetic plastics from vinyl polymers and polyurethanes. More particularly it relates to a process for the production of light stable synthetic plastics having utility as films, casting compounds, molded objects and the like.

It is known that vinyl polymers, for example, polyvinyl chloride, can be mixed with polyurethanes to prepare cross-linked polyurethanes. However, difficulties in obtaining homogeneous mixtures of these materials generally occur during the rolling operation. Even with relatively small additions of polyvinyl chloride, the mixtures become irreversibly turbid at room temperature when a tensile or bending stress is applied. The production of foil material from mixtures of these two materials is practically impossible because of a lack of miscibility.

In accordance with this invention there is provided a novel polyurethane-vinyl polymer composition comprising a mixture of a vinyl polymer and a polyurethane prepared from polyesters having molecular weight of from about 400 to about 4000, said polyesters being obtained from dicarboxylic acids and glycols, and aliphatic polyisocyanates. Optionally a chain extender having a molecular weight below about 400 may be used in the preparation of the polyurethanes. In particular, the polyurethane used in the process of this invention is formed from a polyester component which contains from about 5 to about 100% of a mixed polyester of a dicarboxylic acid and at least 2 polyhydric alcohols each of which is present in said polyester in an amount of at least 3 mol percent.

The polyurethanes to be used in accordance with this invention contain as structural component, a mixed polyester of at least two polyhydric alcohols. Adipic acid is preferably used as the dicarboxylic acid for the polyester, but it is also possible to use, for example, maleic acid, fumaric acid, succinic acid, itaconic acid, azelaic acid or sebacic acid.

The polyhydric alcohols are preferably alkylene or aralkylene glycols such as ethylene glycol, butylene glycol, hexamethylene glycol, 2,2-dimethyl propane-1,3-diol, propylene glycol or their alkoxylation products, allyl monoglycerol ether, thiodiglycol, xylylene glycol and bis-(β-hydroxyethyl)-hydroquinone ether or terephthalate. Minor amounts of alcohols of higher valency such as trimethylolpropane can also be used.

The polyesters have molecular weights from about 400 to about 4000, preferably from about 1000 to about 2500. As an additional structural component for the polyurethane, it is also possible to use concurrently with the critical polyesters, the conventional polyesters, polyester amides, polyethers, polyacetals or polythioethers. It is also possible concurrently to use a second polyurethane which is built up from the usual polyhydroxyl compounds, i.e. does not contain the mixed polyester described above.

To produce the polyurethane, aliphatic polyisocyanates are used and these include alkylene diisocyanates such as tetramethylene diisocyanate, hexamethylene diisocyanate, xylylene diisocyanate, perhydrogenated phenylene, toluylene or naphthylene diisocyanates or perhydrodiphenylmethane diisocyanate. Aliphatic triisocyanates can contain biuret or urethane groupings, but only minor amounts are to be used. Hexamethylene diisocyanate is of particular advantage. It is also possible to use small quantities of aromatic diisocyanates, the dimeric toluylene-2,4-diisocyanate is most advantageous in this modification.

The chain extenders with a molecular weight below about 400, which, optionally, are concurrently used during the production of the polyurethane, can be polyhydric alcohols, amines, amino alcohols or water. They can additionally contain ether, ester, amide, urethane, urea or acetal groupings. As well as the glycols already mentioned as ester components, it is, for example, possible to use amino ethanol, butylene diamine or toluylene diamine.

The polyurethane is produced in other respects by one of the numerous methods known per se; the indicated components can be reacted with one another in any desired sequence by the isocyanate polyaddition process. All that is critical as regards the formation of the polyurethane is the presence of the copolymer which has been described as the sole component or as a proportionate component in a mixture in the structure of the polyhydroxyl compound.

Vinyl polymers include, for example, polyvinyl chloride, polyvinylidene chloride, polyvinyl acetate or copolymers of the basic monomers.

It is possible for all or a part of the vinyl polymer to be already present during the production of the polyurethane. Generally speaking, however, the vinyl polymer is mixed with the polyurethane, after preparing the components of the mixture, by homogenization, preferably on a roll stand, advantageously at temperatures from about 140° C. to about 180° C. The components of the mixture can also be allowed to run through an extruder. The usual plasticisers or fillers can additionally be incorporated. The mixing ratio between vinyl polymer and polyurethane may be from about 49:1 to 1:49, preferably from about 2:1 to 1:2.

The synthetic plastic mixtures which are obtained are thermoplastic and can be processed in the manner usual for thermoplastic plastics. Thus, the shaping is effected by pressing, injection-molding, extrusion or calendering.

The products of the process are practically colorless and usually transparent. Even when they contain 50% of a vinyl polymer, they show a surprising elastomeric character. Their behavior at low temperatures is excellent.

The following illustates its preparation of typical polyesters and polyurethanes of this invention.

The invention may be further illustrated by the following examples in which parts are given by weight unless otherwise specified.

Preparation of a polyester

A mixture of about 4,380 parts of adipic acid (30 mols), about 2600 parts of hexane-1,6-diol (22 mols) and about 1,250 parts of 2,2-dimethyl propane-1,3-diol (12 mols) is condensed, initially without vacuum, by heating to about 200° C. until no more water distills over. A vacuum is then applied and condensation is continued until the acid number has fallen to about 1 to 2. The OH number is 65.

Preparation of a polyurethane

Corresponding to the data given in the Table I, the polyester and the polyisocyanate are combined and then the chain extender is added. It is, however, possible with equal success to mix the polyester with the chain extender and then to add the polyisocyanate. The reaction time at the reaction temperatures indicated is about 10 to 30 minutes. The liquid reaction composition is poured into molds and finally heated as indicated.

After the polyurethanes of the compositions shown in Table I were prepared, several examples of mixtures of polyurethanes and vinyl compounds were prepared in accordance with the quantities and materials as set forth in Table II.

EXAMPLES 1 TO 13

The quantities of polyvinyl chloride and polyurethane indicated in the following Table II and optionally, plasticizers, are processed with addition of 1% (calculated on polyvinyl chloride) of dibutyl-tin dimercaptide as a stabilizer and for about 10 minutes on a roll stand at about 160° C. to form a rolled sheet. The test elements cut out of this rolled sheet are pressed for about 6 minutes at about 160° C. The mechanical properties of the test elements are given in Table III.

TABLE II

| Example | (A) | (B) | Polyurethane | Plasticizer |
|---|---|---|---|---|
| 1 | 60 | | 40 I-VII | |
| 2 | 50 | | 50 I-VII | |
| 3 | 40 | | 60 I-VII | |
| 4 | 30 | | 70 I, III, IV, VII | |
| 5 | 20 | | 80 I, III | |
| 6 | | 60 | 40 III, VI | |
| 7 | | 50 | 50 III, VI | |
| 8 | | 40 | 60 III, VI | |
| 9 | | 50 | 25 III plus 25 VIII | |
| 10 | | 50 | 25 IX plus 25 X | |
| 11 | | 50 | 50 XI, XII | |
| 12 | | 30 | 50 XI, XII | |
| 13 | | 60 | 25 VI | 15 (a)–(d) |

(A) Polyvinyl chloride (K-value 70) produced by emulsion polymerization.
(B) Polyvinyl chloride (K-value 70) produced by suspension polymerization.
  (a) Dioctyl phthalate.
  (b) Diphenyl cresol phosphate.
  (c) Adipic acid/butanediol polyester (molecular weight 2,000).
  (d) Butadiene/acrylonitrile copolymer containing about 33% of acrylonitrile.

TABLE I

| Polyurethane | Mixed Polyester | P 1 | P 2 | Chain Extender | Polyisocyanate | Reaction Temperature, °C. | Final Heating Time, 100° C. in hours |
|---|---|---|---|---|---|---|---|
| I | 925 | | | 87.3 H | | 110–140 | 10 |
| II | 925 | | | 2.7 B | 92.0 H | 90–120 | 24 |
| III | 925 | | | 27.0 B | 139.0 H | 120–150 | 5 |
| IV | 925 | | | 50.0 B | 185.0 H | 110–130 | 8 |
| V | 935 | | | 74.0 B | 231.0 H | 40–140 | 2 |
| VI | 1,330 | | | 89.7 A | 209.0 H | 120–150 | 1 |
| VII | 925 | | | 5.4 W | 145.0 H | 80–100 | 5 |
| VIII | | 1,045 | | 27.0 B | 139.0 H | 110–130 | 10 |
| IX | 1,203 | | | 64.0 B | 209.0 H plus 38.5 T | 50–100 | 3 |
| X | | 1,290 | | 64.0 B | 209.0 H plus 38.5 T | 50–130 | 1 |
| XI | 469 | 500 | | 49.0 B | 161.0 H plus 29.6 T | 50–100 | 5 |
| XII | 693 | | 232 | 73.5 B | 242.0 H plus 44.4 T | 50–100 | 2 |

P 1—Polyester of ethylene glycol and adipic acid (OH 56, Acid 1).
P 2—Polyester of ethylene glycol and adipic acid (OH 180, Acid 1).
H—Hexamethylene diisocyanate.
B—1,4-butanediol.
T—Dimeric toluylene diisocyanate.
W—Water.
A—Bis-(β-hydroxyethyl)-hydroquinone ether.

The products so obtained were then subjected to the tests for mechanical properties shown in Table III.

TABLE III

| Example | DIN 53504, T-pieces | | DIN 53504—ring | | | DIN 53504—ring Modulus kp./cm.² at 20–300% elongation | DIN 53505 Shore Hardness A/D |
|---|---|---|---|---|---|---|---|
| | Tensile strength, kp./cm.² | Breaking elongation, percent | Tensile strength, kp./cm.² | Breaking elongation, percent | Permanent elongation after 1 min., percent | | |
| 1 I | 166 | 510 | 138 | 388 | 20 | | |
| II | 155 | 350 | 50 | 1,307 | 7,100 | 5/22 | |
| III | 180 | 405 | | | | | |
| IV | 224 | 432 | | | | | |
| V | 258 | 390 | | | | | |
| VI | 245 | 331 | 153 | 300 | 27 | 76/171 | |
| VII | 228 | 394 | 205 | 312 | 21 | 81/204 | |
| 2 I | 160 | 680 | 158 | 415 | 20 | 26/128 | |
| II | 108 | 380 | | | | | |
| III | 192 | 553 | | | | | |
| IV | 238 | 442 | | | | | |
| V | 232 | 370 | | | | | |
| VI | 198 | 464 | 142 | 405 | 23 | 31/146 | |
| VII | 206 | 530 | 152 | 332 | 5 | 18/144 | |

TABLE III—Continued

| Example | DIN 53504, T-pieces | | DIN 53504—ring | | | DIN 53504—ring Modulus kp./cm.² at 20-300% elongation | DIN 53505 Shore Hardness A/D |
|---|---|---|---|---|---|---|---|
| | Tensile strength, kp./cm.² | Breaking elongation, percent | Tensile strength, kp./cm.² | Breaking elongation, percent | Permanent elongation after 1 min., percent | | |
| 3 I | 150 | 880 | 130 | 515 | 22 | 21/118 | |
| II | 92 | 460 | | | | | |
| III | 242 | 620 | | | | | |
| IV | 247 | 552 | | | | | |
| V | 255 | 480 | | | | | |
| VI | 205 | 640 | 132 | 582 | 41 | 15/102 | |
| VII | 196 | 578 | 125 | 460 | 7 | 8/81 | |
| 4 I | 70 | 1,112 | 107 | 620 | 31 | 13/74 | |
| III | 262 | 800 | | | | | |
| IV | 340 | 608 | | | | | |
| VII | 152 | 518 | 100 | 445 | 7 | 5/62 | |
| 5 I | 48 | 1,470 | | | | | |
| III | 221 | 846 | | | | | |
| 6 III | 219 | 284 | 187 | 180 | 20 | | |
| VI | 157 | 285 | 176 | 211 | 16 | 68/— | |
| 7 III | 120 | 364 | 118 | 303 | 26 | 32/144 | |
| VI | 130 | 379 | 152 | 314 | 16 | 32/144 | |
| 8 III | 102 | 467 | 85 | 430 | 66 | | |
| VI | 87 | 426 | 119 | 476 | 45 | 22/111 | |
| 9 | | | | | | | |
| 10 | 261 | 365 | 132 | 390 | | 13/101 | 99/60 |
| 11 XI | 232 | 472 | 193 | 420 | | 59/172 | |
| XII | 276 | 410 | 225 | 345 | | 82/213 | |
| 12 VI | 205 | 385 | 184 | 352 | | 26/142 | |
| XII | 258 | 394 | 185 | 350 | | 26/166 | |
| 13 a | 189 | 428 | | | | 75/35 | |
| b | 185 | 409 | | | | 76/35 | |
| c | 198 | 436 | | | | 80/40 | |
| d | 221 | 396 | | | | 88/55 | |

EXAMPLE 14

A perlon fleece (1.2 denier and a weight of 950 g./m.²) which has been given a slight buffing and has been strengthened in customary manner with 50% polyacrylates, is coated by the reversing process as follows:

400 parts by weight of a 10% solution of polyurethane III and suspension polyvinyl chloride (K-value 70) are prepared in tetrahydrofurane at a ratio of 1:1 and mixed with 5% of a conventional black collodion pigment for dyeing.

A silicon-rubber matrix of 1340 cm.², provided with leather grains, is uniformly coated with 25 parts by weight of the above solution. 380 parts by weight of the solution are then uniformly sprayed onto the coated matrix by means of a conventional spray gun (nozzle orifice 2–2.5 mm., spraying pressure 4 atmospheres), a mat of finely interlocked fibres being thus formed. The quantity of solids totally applied is 300 g./m.². The mat is aerated for 10 minutes at room temperature. During this time the buffed surface of the above fleece (1340 cm.²) is provided by brushing with a thin layer of an isocyanate-modified polyester dissolved in ethyl acetate, allowed to dry for 5 minutes and the fleece is pressed with the surface bearing the adhesive layer onto the fibrous mat. After 10 minutes the sheet is drawn off from the matrix. Artificial leather of a leather-like surface and a leather-like handle is obtained, which has a water vapor permeability of 2 mg./cm.² (determined according to IVP 15, . . .) and a breaking strength of more than 100,000 foldings (measured with the Bally Flexometer).

EXAMPLE 15

A paper web (soda kraft paper, unilaterally smooth) fully sized and fully bleached, having a weight of 70 g./m.², is coated with a mixture (1:1) of polyurethane III and suspension polyvinyl chloride (K-value 70) by means of the roller melting process (melting roller temperature 160±5° C.).

The paper web is coated entirely uniformly and a smooth or embossed surface is obtained. At a roller pressure of 50 kp./cm. (80, 110) the coating thickness is 0.22 (0.13, 0.11) mm., the breaking endurance strength according to DIN 53,359 is at 20,000 (20,000, 8,000) foldings.

EXAMPLE 16

A cotton cambric fabric of a weight of 75 g./m.² is coated with a mixture of polyurethane III, an adipic acid-1,3-butanediol-polyester as plasticizer and emulsion polyvinyl chloride (K-value 60) at a ratio of 30:20:50 as described in Example 2.

At a melting roller pressure of 50 (80, 110) kp./cm.² a uniform coating of a thickness of 0.13 (0.04, 0.02) mm. is obtained. After 100,000 foldings (according to DIN 53,359) cracking does not yet occur.

As can be seen from the results of the tests described in Table III, cross-linked polyurethane compounds are obtained having excellent strength, elongation, and hardness characteristics.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the preparation of a light stable and homogeneous plastic which comprises admixing a member selected from the group consisting of polyvinyl chloride, polyvinylidene chloride, polyvinyl acetate and copolymers thereof with a polyurethane comprised of an organic polyisocyanate and a polyester having a molecular weight of from about 400 to about 4,000, about 5 to about 100% by weight of the polyester being comprised of a mixed polyester of a dicarboxylic acid and hexane-1,6-diol and 2,2-dimethyl propane-1,3-diol, each of the alcohols being present in the mixed polyester in an amount of at least 3 mol percent, wherein the polyurethane comprises at least about 25% by weight of the admixture.

2. A light stable and homogeneous plastic composition comprised of a member selected from the group consisting of polyvinyl chloride, polyvinylidene chloride, polyvinyl acetate and copolymers thereof and a polyurethane comprised of an organic polyisocyanate and a polyester having a molecular weight of from about 400 to about 4,000, about 5 to about 100% by weight of the polyester being comprised of a mixed polyester of a dicarboxylic acid and hexane-1,6-diol and 2,2-dimethyl propane-1,3-diol, each of the alcohols being present in the mixed polyester in an amount of at least 3 mol percent, wherein the polyurethane comprises at least about 25% by weight of the admixture.

3. The composition of claim 2 to which which has been added a chain extender.

4. The composition of claim 2 in which said vinyl polymer is polyvinyl chloride.

References Cited

UNITED STATES PATENTS 2,798,859   7/1957   Bruce.

FOREIGN PATENTS 844,240   8/1960   Great Britain.
203,836   11/1954   Australia.
226,298   11/1958   Australia.

SAMUEL H. BLECH, *Primary Examiner.*

PAUL LIEBERMAN, *Assistant Examiner.*

U.S. Cl. X.R.

117—138.8, 145, 155, 161; 260—31.8, 30.6, 33.2, 45.75, 75